United States Patent
Roche

(10) Patent No.: US 10,415,588 B2
(45) Date of Patent: Sep. 17, 2019

(54) FAN BLADE WITH SEGMENTED FAN BLADE COVER

(71) Applicant: United Technologies Corporation, Hartford, CT (US)

(72) Inventor: Charles H. Roche, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 554 days.

(21) Appl. No.: 15/039,276

(22) PCT Filed: Sep. 29, 2014

(86) PCT No.: PCT/US2014/058054
§ 371 (c)(1),
(2) Date: May 25, 2016

(87) PCT Pub. No.: WO2015/105547
PCT Pub. Date: Jul. 16, 2015

(65) Prior Publication Data
US 2017/0023009 A1      Jan. 26, 2017

Related U.S. Application Data

(60) Provisional application No. 61/908,827, filed on Nov. 26, 2013.

(51) Int. Cl.
    *F01D 5/14*         (2006.01)
    *F04D 29/38*       (2006.01)
    (Continued)

(52) U.S. Cl.
    CPC .......... *F04D 29/388* (2013.01); *F01D 5/147* (2013.01); *F01D 5/282* (2013.01); *F01D 21/045* (2013.01);
    (Continued)

(58) Field of Classification Search
CPC .... F04D 29/388; F04D 29/325; F04D 29/023; F04D 29/324; F01D 5/147; F01D 5/282; F01D 5/16
See application file for complete search history.

(56) References Cited

U.S. PATENT DOCUMENTS 5,634,771 A    6/1997   Howard et al.
5,725,355 A    3/1998   Crall et al.
(Continued)

FOREIGN PATENT DOCUMENTS

EP          0926312 A2     6/1999
WO    WO 2015/095205     *   6/2015

OTHER PUBLICATIONS

European Search Report for Application No. EP 14 87 8258.
(Continued)

*Primary Examiner* — Aaron R Eastman
(74) *Attorney, Agent, or Firm* — Cantor Colburn LLP

(57) ABSTRACT

A lightweight fan blade for use in turbofan gas turbine engines is disclosed. The fan blade includes a metallic body having a pressure side and a suction side. The suction side of the body includes one or more cavities. A cover is then attached to the suction side of the body to cover or enclose the one or more cavities. The cover includes one or more transverse weakened areas, such as a transverse slit so that the cover separates into one or more smaller segments in the event of a foreign object damage (FOD) or fan blade out (FBO) event occurs. The smaller segments of the cover are less likely to do damage to downstream components such as the low and high-pressure compressors. A single smaller segment of the cover may allow for continued operation of the engine because the imbalance created by the event may be tolerated by the engine.

20 Claims, 2 Drawing Sheets

(51) Int. Cl.
*F01D 5/28* (2006.01)
*F01D 21/04* (2006.01)
*F04D 29/02* (2006.01)
*F04D 29/32* (2006.01)

(52) U.S. Cl.
CPC ......... *F04D 29/023* (2013.01); *F04D 29/325* (2013.01); *F05D 2220/36* (2013.01); *F05D 2230/72* (2013.01); *F05D 2230/80* (2013.01); *Y02T 50/672* (2013.01); *Y02T 50/673* (2013.01)

(56) References Cited

U.S. PATENT DOCUMENTS

| | | | | |
|---|---|---|---|---|
| 6,039,542 | A * | 3/2000 | Schilling | F01D 5/16 416/224 |
| 9,121,287 | B2 * | 9/2015 | Weisse | F01D 5/147 |
| 2005/0254955 | A1 | 11/2005 | Helder et al. | |
| 2008/0253885 | A1 * | 10/2008 | Foose | F01D 5/147 415/208.2 |
| 2010/0136278 | A1 * | 6/2010 | Cadd | B29C 63/0021 428/60 |
| 2012/0034833 | A1 * | 2/2012 | Schaube | A63C 11/227 442/172 |
| 2012/0216402 | A1 | 8/2012 | Krizansky et al. | |
| 2013/0039774 | A1 * | 2/2013 | Viens | F01D 5/147 416/226 |
| 2013/0078107 | A1 | 3/2013 | Weisse et al. | |
| 2013/0101406 | A1 * | 4/2013 | Kweder | B29C 70/46 415/200 |
| 2013/0156594 | A1 * | 6/2013 | Kray | F01D 9/042 416/241 A |
| 2014/0072427 | A1 * | 3/2014 | Weisse | F01D 5/147 415/220 |
| 2015/0125308 | A1 * | 5/2015 | Radomski | B23P 15/04 416/224 |
| 2015/0252679 | A1 * | 9/2015 | Pope | F01D 5/147 415/183 |
| 2016/0024934 | A1 * | 1/2016 | Schwarz | F01D 5/16 60/805 |
| 2016/0177732 | A1 * | 6/2016 | Whitehurst | F01D 5/147 60/805 |
| 2016/0311052 | A1 * | 10/2016 | Wallis | B23K 20/02 |
| 2016/0333710 | A1 * | 11/2016 | Klinetob | F01D 5/26 |

OTHER PUBLICATIONS

International Search Report for International Application No. PCT/US2014/058054; dated Jul. 17, 2015.
Written Opinion for International Application No. PCT/US2014/058054; dated Jul. 17, 2015.

* cited by examiner

FAN BLADE WITH SEGMENTED FAN BLADE COVER

BACKGROUND

Technical Field

Disclosed herein are fan blades for turbofan gas turbine engines. In one example, a disclosed fan blade may include a metallic body having one or more hollow cavities for weight reduction and a segmented cover disposed on a the suction side of the fan blade and that encloses the hollow cavities. The disclosed segmented cover reduces the risk of damage to downstream engine components in the event of damage to the fan blade that causes partial or complete dislodgement of the cover from the fan blade.

Description of the Related Art

A geared turbofan engine is a type of turbofan airplane engine, similar to a turbojet. A geared turbofan engines, also known as a type of a gas turbine engine, may include a geared, ducted fan and a smaller diameter gas turbine engine mounted behind the fan that powers the fan. Part of the airstream passes through a core of the engine, which includes low and high-pressure compressors, a combustion chamber and high and low pressure turbines. The high and low-pressure turbines are disposed downstream of the combustor between the combustor and an exhaust. In contrast, the low and high compressors are disposed upstream of the combustor and between the combustor and fan. The high and low-pressure turbines drive the high and low-pressure compressors respectively and the fan.

Weight reduction of gas turbine engines used for aircraft results in fuel savings. One known means for reducing the weight of a gas turbine engine is to include hollow cavities in some of the components that do not need to be solid metal to meet structural requirements. One such component is a fan blade, also known as a type of airfoil. Some fan blades include a titanium or aluminum body with recesses or cavities disposed in the non-flow path convex side of the fan blade, also known as the suction side of the fan blade. The opposite side of the fan blade is the concave or pressure side. The cavities may be covered by a composite cover, typically made from fibers and resin, and the fan blade is the then covered with a damage resistant coating that is typically non-structural and inert.

During engine operation, a fan blade or a fragment thereof may separate from the remainder of the fan (a so-called "fan blade-off" or "fan blade-out" event (FBO)). An FBO event may occur as a result of a foreign object striking one or more of the fan blades, or during a FOD (foreign object damage) event. One portion of a fan blade that is vulnerable to separation from the fan blade body is the composite cover for the cavities. Partial or complete separation of the cover from one or more fan blades can cause damage to a downstream component of the engine. The damage caused by the separated cover or partial separated cover may depend on numerous factors, including the size and mass of the separated cover or fragment, the design of the downstream engine components, etc. Further, partial or complete separation of a cover may displace the center of gravity (center of mass) of the entire fan assembly from its central axis. At least initially, bearings may constrain the fan radially so that it continues to rotate about its central axis rather than about the displaced center of gravity. However, if the bearings fail, rotation of the fan about the displaced center of gravity may result in forces that may also damage other downstream engine components.

If an FBO event severely damages the engine, the engine may cease normal operation, shut down or lock, and consequently produce no further power. However, despite the engine shut down, it is undesirable to stop rotation of the fan. If rotation of the fan stops, the engine becomes an extreme source of aerodynamic drag for the aircraft. Such drag would be particularly significant in a twin-engine aircraft, with one engine mounted to each wing nacelle. This is a common construction for many passenger aircraft. Thus, in a twin-engine aircraft, the combination of drag from the shut down engine and thrust from the remaining engine would produce an excessive yawing moment not easily overcome by the aircraft rudder.

To overcome this problem, the fan of a shut down or locked gas turbine engine may be designed continue to spin at above-idle speed as air is forced through the fan due to forward aircraft motion. This unpowered fan rotation is called "windmilling." Even a fan of a shut-down engine on the ground may be designed to windmill. A windmilling engine has less aerodynamic drag than does a completely stopped or locked engine. To remain windmilling, the engine must resist damage to the turbine, bearings, etc.

The engine must also be configured to avoid catastrophic damage, which may be caused by fan blade failure, and which might permit fan blade portions to enter the high-pressure turbine. If a part or debris enters the high-pressure turbine, for example, centrifugal forces may cause the parts or debris to puncture one or both of the nacelles, the fuselage or allow the engine to detach from the aircraft or damage the wing.

Hence, there is a need for an improved fan blade design that is lightweight, includes hollow cavities that are covered, but that includes a means for covering the hollow cavities that will provide better resistance to damage in the event of any FBO-causing event.

SUMMARY OF THE DISCLOSURE

In one aspect, a fan blade or airfoil is disclosed. The disclosed fan blade may include a body that may include a pressure side and a suction side. The suction side may include at least one cavity that extends into the suction side and towards the pressure side. The disclosed fan blade may also include a cover that overlays the cavity and that is adhered to or otherwise connected to the body. The disclosed fan blade may also include a cover that includes at least one transverse slit that divides the cover into a plurality of segments.

In another aspect, a fan blade assembly is disclosed. The disclosed fan blade assembly may include a hub coupled to a plurality of radially outwardly extending fan blades. Each fan blade may include a body that has a pressure side and a suction side. The suction side of the fan blade may include cavity that extends into the suction side and towards the pressure side. Each fan blade may also include a cover that overlays the cavity. The cover may include at least one transverse slit that divides the cover into a plurality of segments.

In yet another aspect, a method of fabricating a fan blade of a turbofan gas turbine engine is disclosed. The method may include manufacturing a body including a pressure side and a suction side. The suction side may include a plurality of cavities that extend into the suction side and towards the pressure side. The method may further include providing a cover that is sized to cover the cavities. The cover may include at least one transverse slit that divides the cover into a plurality of segments. The method may further include covering the cavities with a cover and connecting the cover to the suction side of the body. The method may further include coating the cover with a coating layer.

In any one or more of the embodiments described above, the cover may include at least two slits. In any one or more of the embodiments described above, the cover may be coated with a coating layer.

In any one or more of the embodiments described above, the cavity may include a plurality of cavities.

In any one or more of the embodiments described above, when a plurality of cavities are disposed on the suction side of the body, the cavities may be separated by walls that extend toward the suction side of the body.

In any one or more of the embodiments described above, the walls may terminate at an outer edge that engages an underside of the cover.

In any one or more of the embodiments described above, the cavity accommodates a filler material.

In any one or more of the embodiments described above, the cavity may be filled with a sacrificial material that decomposes or ablates when exposed to heat or a caustic agent.

In any one or more of the embodiments described above, the cover may include fibers and resin or be a composite material that includes fibers and resin.

In any one or more of the embodiments described above, the cover may be a fluoroelastomer. In another aspect, the cover may be metallic.

The covers for the suction side of the fan blade have been described above as including one or more slits. The term "slit" is intended to describe a weakened portion of the cover that is essentially linear. The term slit is intended to encompass any weakened line or narrow region that can divide the cover into distinct segments on either side of the weakened line or narrow region. Other suitable terms or embodiments include perforation, score, groove, slot, notch, etc. Further, the slits described above are described as transverse slits. The term transverse is intended to mean across the cover or extending between the leading edge and the trailing edge of the fan blade. The disclosed slits extend approximately in the direction of the airflow across the cover. One or more slits may be included so that the covers are divided into two or more segments. By dividing the cover into two or more segments, if a portion of the cover becomes detached from the fan blade body, the cover may break along the slit thereby sending only a single segment downstream instead of the entire cover. As a result, the risk of damage to downstream components such as the compressors and turbines is minimized.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
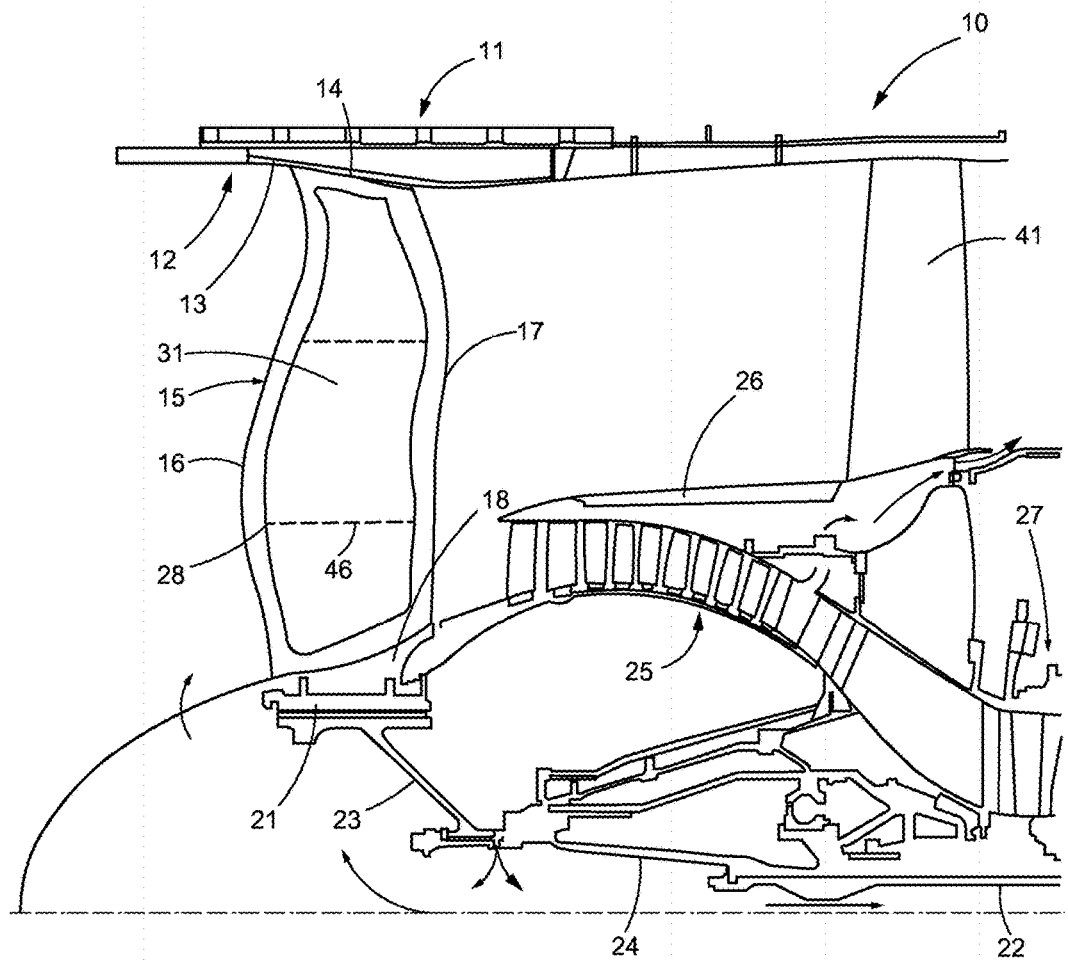
FIG. 1 is a partial sectional view of a turbofan gas turbine engine illustrating one of the disclosed fan blades.

FIG. 1 illustrates part of a turbofan gas turbine engine 10. The engine 10 may include a nacelle 11, which may be lined with a fan case 12 that may include an abradable liner 13 for abuttingly engaging a tip 14 of a fan blade 15 as shown in FIG. 1. The fan blade 15 may include a leading edge 16, a trailing edge 17 and a base or root 18, which may be coupled to the hub 21. The hub 21 may be coupled to the low-pressure shaft 22 via the fan shaft 23 and fan shaft extension 24. Also shown in FIG. 1 is the low-pressure compressor 25, an annular bypass duct 26 and part of the high-pressure compressor 27. Downstream components such as a combustor and high and low-pressure turbines are not shown.

Figures 2, 3:
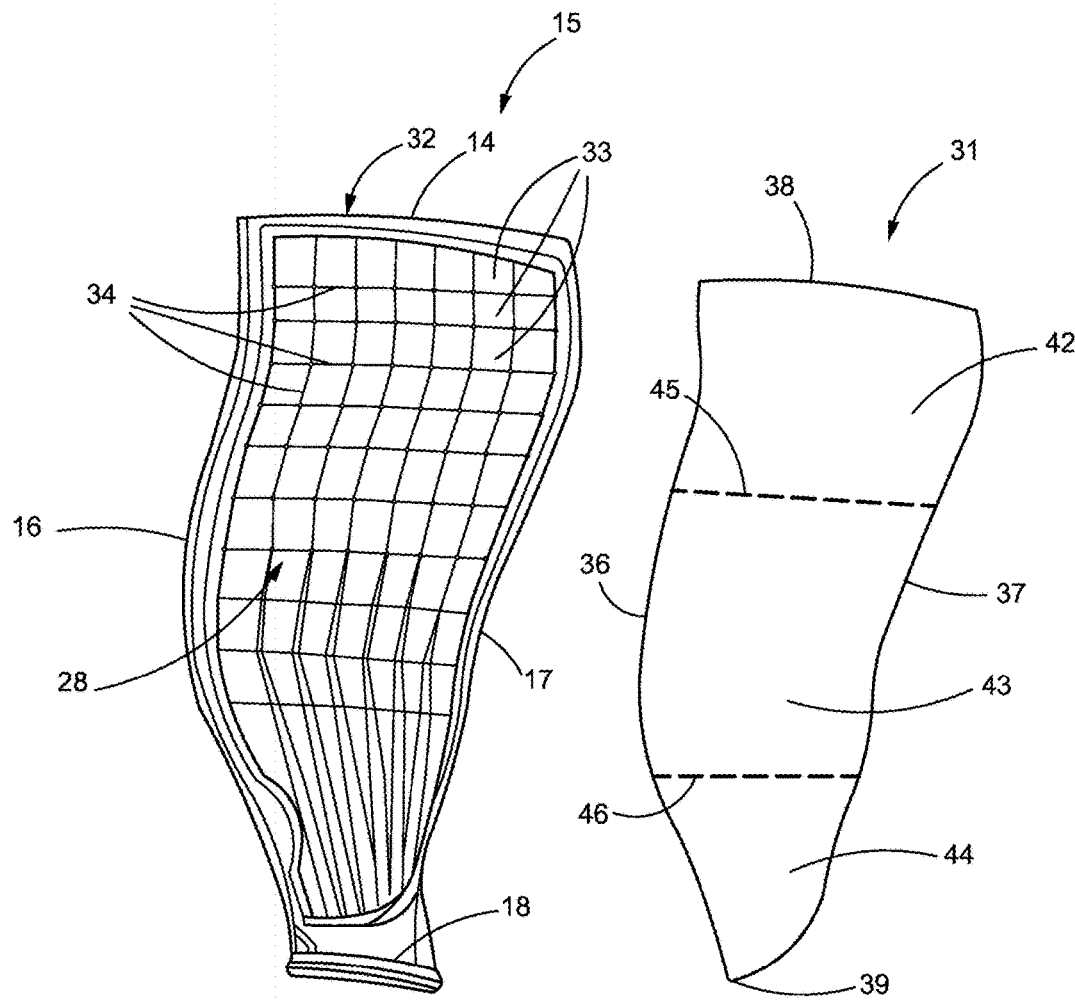
FIG. 2 is a plan view of the suction side of the fan blade body of the fan blade disclosed in FIG. 1.
FIG. 3 is a plan view of a disclosed cover for the suction side of the fan blade body shown in FIG. 2 and that is also shown in FIG. 1.

In addition to leading and trailing edges 16, 17 of the fan blade 15, FIG. 1 also shows the convex or suction side 28 of the fan blade 15, which is illustrated in greater detail in FIG. 2. FIG. 1 further illustrates a cover 31 that is disposed over the suction (or convex) side 28 of the fan blade 15. The cover 31 is explained in greater detail in connection with FIG. 3.

Turning to FIG. 2, the fan blade 15 includes a fan blade body 32. The fan blade body 32 includes the generally convex or suction side 28 as well as a generally concave or pressure side (not shown). The body 32 defines the leading edge 16, the trailing edge 17, the tip 14 and the base 18 of the fan blade 15. To save weight, the fan blade body 32 may include a plurality of cavities shown generally at 33. Instead of a plurality of cavities 33, the fan blade body 32 may also include a single cavity. If a plurality of cavities 33 is included, intersecting walls 34 may divide the cavities and contribute to the structural integrity of the fan blade body 32. The fan blade body 32 may be fabricated from titanium, titanium alloy, aluminum, an aluminum alloy or other suitable materials that will be apparent to those skilled in the art.

For aerodynamic purposes, the cavity or cavities 33 should be covered with a robust, yet lightweight cover 31 as shown in FIGS. 1 and 3. Turning to FIG. 3, the cover 31 may also include a leading edge 36, a trailing edge 37, a distal end 38, and a proximal end 39. To provide a smooth transition between the cover 31 and the fan blade body 32, a coating (not shown) may be applied over the cover 31.

However, despite the use of such coatings, during a FOD (foreign object damage) event such as a bird strike, the cover 31 can become dislodged from the fan blade body 32 which can cause damage to the downstream components of the engine 10 as shown in FIG. 1 including, but not limited to the low pressure compressor 25, high pressure compressor 27, guide vane 41 as well as other downstream components (not shown). Further, structurally, there is a sharp contrast in strength and stiffness between the cover 31 and the fan blade body 32. This contrast in strength and stiffness between the cover 31 and the fan blade body 32 can contribute to the cover 31 flexing without any corresponding flex or movement of the body 32, which can cause the cover 31 to become wholly or partially dislodged from the fan blade body 32.

Instead of permitting the entire cover 31 from becoming dislodged from the fan blade body 32, the cover 31 may be divided into a plurality of segments, such as those shown at 42, 43, 44 in FIG. 3. The segments 42, 43, 44 are defined by the slits 45, 46. As noted above, the slits 45, 46 may be perforations, scores, notches, grooves, slots or any such feature in the cover 31, which weakens the cover 31 along a transverse line or narrow area between the leading edge 36 and trailing edge 37 of the cover 31. The slits 45, 46 are placed on the cover 31 so that the segments 42, 43, 44, that may be liberated as a result of an FOD event, are sufficiently small in size and mass so as to avoid damage to the multiple downstream components of the engine 10. Avoiding damage to downstream components or reducing the likelihood of damage to downstream components reduces the likelihood of engine failure, engine shut down, engine locking, etc. Still further, the strategic placement of the slit or slits 45, 46 on the cover may also avoid damage to downstream components that would require repair or replacement of one or more components during periodic maintenance and inspections.

In the design shown in FIG. 3, in the event of a FOD event, the entire cover 31 will not become dislodged from the fan blade body 32 but, instead, the cover 31 may separate along one or both of the slits 45, 46. In some cases, only the segment 42 will become dislodged or, in other cases, only one of the other segments 43, 44 may become dislodged. In any event, the entire cover 31 may not become dislodged in its entirety due to the transverse slit(s) 45, 46. By breaking the cover 31 up into a plurality of segments 42, 43, 44, large pieces of the cover 31 will not be propelled downstream but, instead, only discrete segments 42, 43, 44 will be propelled downstream. The smaller segments 42, 43, 44 have less of a chance of causing damage to downstream components of the engine 10. The number of slits 45, 46 can vary from a single slit to three or more slits.

Typically, the cover 31 is fabricated from a fiber/resin composite material, usually epoxy-based such as carbon fiber reinforced polymer (CFRP) and/or glass fiber reinforced polymer (GFRP). A protective coating (not shown) may be applied over the cover 31. Such a coating may be an elastomer such as a fluoropolymer elastomer like VITON®. Alternatively, the cover 31 may be metallic, such as, but not limited to, aluminum, titanium, or various alloys thereof. Thus, a typical cover 31 may be fabricated from relatively robust materials that, absent the slit(s) 45, 46, could damage various downstream components such as the low pressure compressor 25, the high pressure compressor 25 or various other parts or components associated with any portion of the engine 10 disposed downstream of the fan blades 15. If the cover 31 is fabricated from a metal or alloy, an additional coating is not required. However, an additional coating may be applied over the cover 31 if the cover is fabricated from a CFRP, GFRP, fluropolymer elastomer or other composite materials.

What is claimed:

1. A fan blade comprising:
   a body including a pressure side and a suction side; the suction side including at least one cavity;
   a cover that overlays the cavity and that is adhered to the body; and
   the cover including at least one transverse slit that divides the cover into a plurality of segments.

2. The fan blade of claim 1 wherein the transverse slit is located on the cover to control a size of the segment that is liberated from the fan blade as a result of a foreign object damage (FOD) event.

3. The fan blade of claim 1 further including a coating disposed over the cover.

4. The fan blade of claim 1 wherein the cavity includes a plurality of cavities.

5. The fan blade of claim 4 wherein the cavities are separated by walls that extend towards the suction side of the body.

6. The fan blade of claim 5 wherein the walls each terminate at an outer edge that engages an underside of the cover.

7. The fan blade of claim 1 wherein the cavity accommodates a filler material.

8. The fan blade of claim 1 wherein the cavity is filled with a sacrificial material.

9. The fan blade of claim 1 wherein the cover is fabricated from fibers and resin or a fluoroelastomer.

10. The fan blade of claim 1 wherein the at least one transverse slit weakens the cover along a transverse line between a leading edge and a trailing edge of the cover so that the plurality of segments can be liberated from the cover.

11. A fan blade assembly comprising:
    a hub coupled to a plurality of radially outwardly extending fan blades, each fan blade including a body including a pressure side and a suction side;
    the suction side including at least one cavity that extends into the suction side and towards the pressure side;
    a cover that overlays the cavity, the cover including at least one transverse slit that divides the cover into a plurality of segments.

12. The fan blade assembly of claim 11 wherein the transverse slit is located to control a size of one of the segments liberated from the fan blade as a result of a foreign object damage (FOD) event.

13. The fan blade assembly of claim 11 further including a plurality of cavities.

14. The fan blade assembly of claim 13 wherein the cavities are separated by walls that extend towards the suction side of the body.

15. The fan blade assembly of claim 14 wherein the walls each terminate at an outer edge that engages an underside of the cover.

16. The fan blade assembly of claim 11 wherein the cavity accommodates a filler material.

17. The fan blade assembly of claim 11 wherein the cavity is filled with a sacrificial material.

18. The fan blade assembly of claim 11 wherein the cover includes fibers and resin or a fluoroelastomer.

19. The fan blade assembly of claim 11 wherein the at least one transverse slit weakens the cover along a transverse line between a leading edge and a trailing edge of the cover so that the plurality of segments can be liberated from the cover.

20. A method for fabricating a fan blade of a turbofan gas turbine engine, the method comprising:
    manufacturing a body including a pressure side and a suction side, the suction side including a plurality of cavities that extend into the suction side and towards the pressure side;
    providing a cover that is sized to cover the cavities, wherein the cover includes at least one transverse slit that divides the cover into a plurality of segments; and covering the cavities with the cover and connecting the cover to the suction side of the body.

* * * * *